United States Patent [19]
Purtle, Jr.

[11] 3,836,690
[45] Sept. 17, 1974

[54] NAVIGATION DATA COMPUTATION APPARATUS

[76] Inventor: Homer Purtle, Jr., 731A Fernander Ave., Wheeler AFB, Hawaii 96515

[22] Filed: Dec. 6, 1972

[21] Appl. No.: 312,612

[52] U.S. Cl.............. 35/10.2, 35/12 R, 73/178, 235/150.21, 340/27 R
[51] Int. Cl................ G01c 21/00, G09b 19/16
[58] Field of Search....... 235/150.2–150.27, 92 CA, 235/92 CC, 92 FL, 92 T, 150.3, 151.11, 151.34; 73/178; 35/10.2, 11; 340/27, 336, 324 R

[56] References Cited
UNITED STATES PATENTS

| | | | |
|---|---|---|---|
| 2,955,464 | 10/1960 | Elwell, Jr. | 235/150.21 |
| 3,043,508 | 7/1962 | Wright | 235/151.34 |
| 3,504,165 | 3/1970 | Richardson et al. | 235/150.27 |
| 3,549,868 | 12/1970 | Watson et al. | 235/92 T |
| 3,557,350 | 1/1971 | Proctor | 235/150.3 |
| 3,580,421 | 5/1971 | Bickford | 235/92 FL |
| 3,594,563 | 7/1971 | Bishop | 235/151.11 |
| 3,626,398 | 12/1971 | Owens et al. | 340/27 R |
| 3,708,750 | 1/1973 | Bucks et al. | 235/92 T |
| 3,714,867 | 2/1973 | Dargent | 235/92 T |
| 3,729,996 | 5/1973 | Metz | 235/92 FL |

Primary Examiner—Felix D. Gruber
Attorney, Agent, or Firm—Dunlap, Laney, Hessin, Dougherty & Codding

[57] ABSTRACT

An improved navigation data computation apparatus having manually settable data entry devices receiving pilot entered data, a data computation assembly receiving the pilot entered data and providing output signals indicative of predetermined navigation data, and decimal display devices receiving the output signals and providing pilot perceivable output indications indicative of the predetermined navigation data.

12 Claims, 1 Drawing Figure

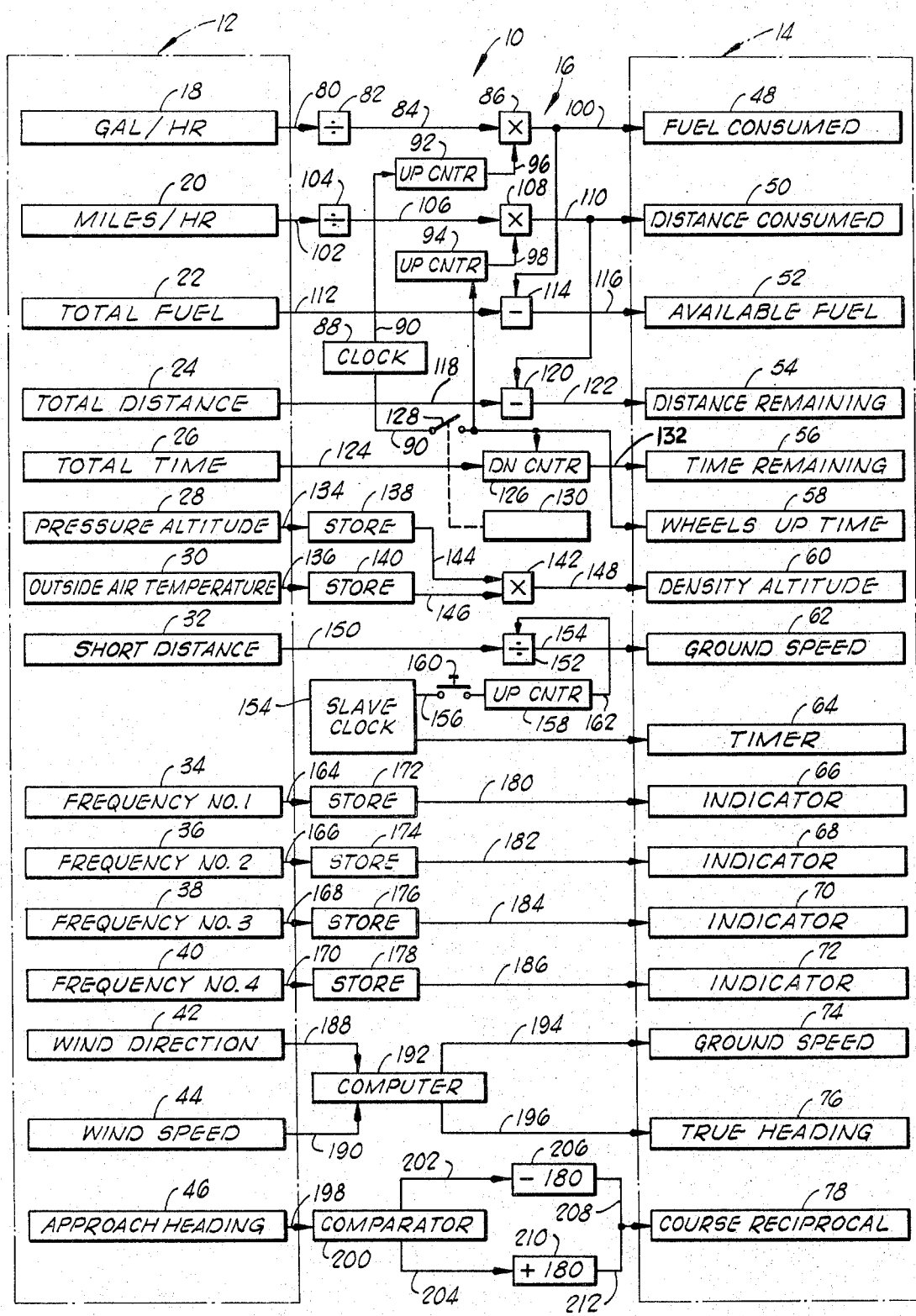

NAVIGATION DATA COMPUTATION APPARATUS

BACKGROUND OF THE INVENTION

1. Field of the Invention

This invention relates generally to improvements in aircraft computer devices and, more particularly, but not by way of limitation, aircraft navigation computation apparatus having manually settable data entry devices and pilot perceivable output decimal display devices.

2. Brief Description of the Prior Art

In the past there have been various navigational aids constructed for installation in aircraft to aid the pilot. There have also been various computer and computer-like devices constructed to automatically calculate various navigation parameters to be utilized to operate additional equipment or, in some instances, for display.

The U.S. Pat. No. 3,612,837, issued to Brandau, disclosed an aircraft strike assurance system relating such navigational parameters as target coordinates, altitude, wind data, fuel flow, fuel weight, air data, compass heading, range, reserve fuel, time to go, and air speed, for example, to determine if a particular mission may be successfully completed. The U.S. Pat. No. 3,649,818, disclosed a groundspeed and time-to-go computer for aircraft wherein pulses were counted during an interval inversely proportional to groundspeed and the count of DME transmitters was counted down to zero, the interval to count down to zero being detected via the computer apparatus.

The U.S. Pat. No. 2,955,464, issued to Hackensack, disclosed an aircraft time of flight indicator constructed to compute and indicate the time-to-go and the time-remaining-to-fly with respect to the aircraft fuel supply. The U.S. Pat. No. 2,992,558, issued to Newell, disclosed a flight range and endurance data indicator having manually settable knobs for supplying certain data to a control circuit automatically calculating predetermined output data. Other forms of aircraft computers or the like computing and utilizing aircraft navigational data were disclosed in the U.S. Pats. No. 3,108,183, issued to Ganley; No. 3,232,530, issued to Ricke; No. 3,206,974, issued to Andresen; No. 2,989,233, issued to Schroeder; No. 2,766,953; issued to Cummings; and No. 3,451,144, issued to Chao.

SUMMARY OF THE INVENTION

An object of the invention is to provide an improved navigation data computation apparatus which is economical in construction and operation particularly useful in general aviation type aircraft.

Another object of the invention is to provide an improved navigation data computation apparatus providing the aircraft course reciprocal in a more convenient, more economical and more efficient manner.

One other object of the invention is to provide an improved navigation data computation apparatus for storing and displaying various navigational data in a more convenient, more economical and more efficient manner.

Yet another object of the invention is to provide an improved navigation data computation apparatus determining aircraft fuel, distance, course and speed data in a more convenient, more economical and more efficient manner.

A still further object of the invention is to provide an improved aircraft navigation computation apparatus which is economical in construction and operation.

Other objects and advantages of the invention will be evident from the following detailed description read in conjunction with the accompanying drawing which illustrates a preferred embodiment of the invention.

BRIEF DESCRIPTION OF THE DRAWING

The single FIGURE in the drawing illustrates a preferred embodiment of a navigational data computation apparatus constructed in accordance with the present invention.

BRIEF DESCRIPTION OF THE PREFERRED EMBODIMENT

Shown in the drawing and designated by the general reference numeral 10 is a navigation data computation apparatus simulating predetermined navigation data for aiding the pilot in the navigation of an aircraft basically comprising: a data input assembly 12, a data display assembly 14 and a data computation assembly 16. In general, the navigation data computation apparatus 10 is constructed to provide and display predetermined data useful to a pilot during the flight of an aircraft, the navigation data computation apparatus 10 of the present invention being particularly useful for providing and displaying pilot-perceivable data in relatively small aircraft where large, complex and costly computer apparatus is not practical. In operation, the pilot enters predetermined data into the data input assembly 12, the pilot-entered data is mathematically manipulated, in one form, and stored, in one other form, via the data computation assembly 16 and the calculated or stored data is displayed via the data display assembly 14, in a manner to be described in greater detail below.

The data input assembly 12 basically comprises a plurality of data entry devices, designated in the drawing by the reference numerals 18, 20, 22, 24, 26, 28, 30, 32, 34, 36, 38, 40, 42, 44 and 46, each data entry device 18 through 46, inclusive, being connected to a preselected, predetermined portion of the data display assembly 14 via a predetermined portion of the data computation assembly 16. Each of the data entry devices 18 through 46, inclusive, is, more particularly, constructed to connect predetermined pilot-entered data to preselected portions of the data computation assembly 16 in response to a physical, mechanical manipulation of the particular data entry device 18 through 46 by the pilot operator.

In a preferred form, the pilot enters the preselected data into the data entry devices 18 through 46 via physical, mechanical manipulation of a thumbwheel type of electrical switch or the like, the data being entered in a decimal type of mathematical form referred to simply herein as a "decimal form". Each of the data entry devices 18 through 46 also includes a decimal-to-binary converter receiving the pilot entered data in a decimal form and converting the received pilot entered data to a binary form of output signal, the output signal of each of the data entry devices 18 through 46 being an electrical signal of a binary form indicative of the pilot entered data. Thumbwheel switches or the like constructed to enter data in a decimal form via physical, mechanical manipulation are well known in the art and commercially available from such manufacturers as Interswitch, designated via the Part No. HB031, for example, the entered decimal data being connected to decimal-to-binary converters for providing output signals in a binary form indicative of the manually entered, decimal data are well-known in the art and commercially available from such manufacturers as Texas Instruments, Inc., designated via the part No. SN54184, for example, and a detailed description of the construction and interconnection is not required herein.

As shown in the drawing, the data entry devices 18 through 46 are each designated with a title indicating the particular type of navigational data to be entered via that particular data entry device. The data entry devices 18 through 46 are sometimes referred to herein via a designation indicative of the type of navigational data entered into that particular data entry device as follows: the gallons per hour entry device 18, the miles per hour entry device 20, the total fuel entry device 22, the total distance entry device 24, the total time entry device 26, the pressure altitude entry device 28, the outside air temperature device 30, the short distance entry device 32, the frequency number one entry device 34, the frequency number two entry device 36, the frequency number three entry device 38, the frequency number four entry device 40, the wind direction entry device 42, the wind speed entry device 44 and the approach heading entry device 46.

The data display assembly 14 basically comprises: a plurality of decimal display devices designated in the drawing by the reference numerals 48, 50, 52, 54, 56, 58, 60, 62, 64, 66, 68, 70, 72, 74, 76 and 78, each decimal display device 48 through 78 being connected to one or more of the data entry devices 18 through 46 via a predetermined portion of the data computation assembly 16 and constructed to display predetermined, computed navigational data in a decimal, pilot perceivable form. Each of the decimal display devices 48 through 78, more particularly, receives a signal indicative of the predetermined, navigational data via the portion of the data computation assembly 16 connected thereto and displays the received data in a decimal pilot perceivable form, the data being displayed upon command by the pilot in one form or in a continuous manner in one other form. Decimal display devices constructed to provide and display predetermined data in a decimal form when activated via the pilot operator or in a continuous manner are well-known in the art, such as a "nixie tube" or "light emitting diode," for example, and usually driven via decoder driver or the like. For example, in those applications where the data is displayed upon command by the pilot, the pilot depresses a pushbutton of the type commercially available from such manufacturers as MultiSwitch and designated via the Part No. PL–4032–05, for example, enabling a binary to BCD (binary coded decimal) converter of the type commercially available from such manufactures as Texas Instruments, Inc. and designated via the Part No. SN54181, for example, the binary to BCD converter being connected to an output display device via a BCD to seven segment device. In this form, the output display device may be of the type commercially available from such manufacturers as Opla Solid-Lite of Edison, N.J. and designated via the Part No. SLA-7, for example.

Referring more particularly to the individual data entry devices 18–46, as shown in the drawing, the gallons per hour data entry device has an output signal 80 indicative of the aircraft fuel consumption expressed in terms of gallons per hour and entered into the data input assembly 12 via the pilot operator utilizing the thumbwheel data entry device 18. The output signal 80 is connected to the input of a divide counter 82 constructed to receive the input signal 80 and provide an output signal 84 (indicative of the aircraft's fuel consumption expressed in terms of gallons per predetermined interval of time) indicative of the input signal 80 divided by a predetermined numeral or, more particularly, divided by the numeral 60, the output signal 84 being thus indicative of the aircraft fuel consumption expressed in gallons per minute. The output signal 84 of the divide counter 82 is connected to the input of a multiply counter 86.

The data computation assembly 16 includes a clock 88 constructed to provide an output clock signal 90 having a predetermined frequency (indicative of the predetermined interval of time) in an activated position thereof. The clock 88 is connected to the aircraft engine or, more particularly, to the aircraft engine starter network such that the clock 88 is activated providing the output clock signal 90 in response to the starting of the aircraft engine. The connection of a clock to an aircraft engine starter circuitry or the like such that the clock is activated in response to the starting of the aircraft engine is well-known in the art and a detailed description of the various control devices and the interconnections therebetween is not required herein.

The clock 88 is constructed such that the clock signal 90 provides an output pulse in increments of substantially 1 minute intervals. Since the clock 88 is activated via the starting of the aircraft engine and provides a clock signal 90 at 1 minute intervals, the clock signal 90 is, more particularly, responsive to and indicative of the number of minutes during which the aircraft engine has been operating, for reasons to be made more apparent below.

The clock signal 90 is connected to the inputs of a pair of up counters 92 and 94, the up counters 92 and 94 each being constructed to receive the clock signal 90 and to provide output signals 96 and 98, respectively. Since the clock 88 clock signal 90 is indicative of the number of minutes during which the aircraft engine has been operating, the count on the up counter 92 or, more particularly, the output signal 96 is responsive to and indicative of the number of minutes during which the aircraft engine has been operating, the count on the up counter 94 being indicative of the time during which the aircraft is lifted off the ground in a manner described below.

The up counter 92 output signal 96 is connected to the multiply counter 86, the multiply counter 86 receiving the divide counter 82 output signal 84 and the up counter 92 output signal 96 and providing an output signal 100 responsive to and indicative of the product of the output signals 84 and 96. Since the output signal 84 is responsive to and indicative of the gallons per minute consumed by the aircraft during the operation thereof as entered into the navigation data computation apparatus 10 via the gallons per hour data entry device 18 and the output signal 96 is responsive to and indicative of the number of minutes of operation of the aircraft engine since the starting thereof, the output signal 100 is responsive to and indicative of the number of gallons of fuel consumed by the aircraft since the starting of the aircraft engine, the output signal 100 being connected to the fuel consumed decimal display device 48. The fuel consumed digital display device 48 thus receives the output signal 100 of the multiply counter 86 and provides a pilot perceivable output signal indicative of the fuel consumed by the aircraft during the operation thereof.

The miles per hour data entry device 20 is constructed such that the pilot can enter the speed of the aircraft expressed in terms of miles per hour via a thumbwheel type of data entry device, the pilot entered data being converted to binary form via a decimal-to-binary converter, in a manner similar to that described before with respect to the gallons per hour data entry device 18. The miles per hour data entry device 20 provides an output signal 102 in a binary form responsive to and indicative of the speed of the aircraft expressed in terms of miles per hour.

The output signal 102 is connected to and received by a divide counter 104, the divide counter 104 providing an output signal 106 responsive to and indicative of the received output signal 102 divided by a predetermined number or, more particularly, divided by the predetermined number 60. Since the output signal 102 is indicative of the aircraft speed expressed in terms of miles per hour, the output signal 106 of the divide counter 104 is indicative of the aircraft speed expressed in terms of miles per hour divided by 60 or, in other words, miles per minute.

The output signal 106 of the divide counter 104 is connected to and received via a multiply counter 108. The multiply counter 108 receives the divide counter 104 output signal 106 and the up counter 94 output signal 98 and provides an output signal 110 responsive to and indicative of the product of the two output signals 106 and 98. Since the output signal 106 is indicative of the aircraft's speed expressed in miles per minute and the output signal 98 is indicative of the total number of minutes of operation of the aircraft's engine while the aircraft is lifted off the ground, the product of the two output signals 106 and 108 or, in other words, the output signal 110 of the multiply counter 108 is indicative of and responsive to the distance consumed or traveled by the aircraft expressed in terms of total miles. The output signal 110 is connected to and received by the distance consumed decimal display device 50, the distance consumed decimal display device 60 receiving the output signal 110 and providing a pilot perceivable output indication indicative thereof.

The total fuel contained in the fuel tanks of the aircraft is entered into the data input assembly 12 by the pilot utilizing the thumbwheel switch type of data entry device 22, the pilot entered data being converted to a binary form via a decimal-to-binary converter in a manner similar to that described with respect to the data entry devices 18 and 20 to provide an output signal 112 responsive to and indicative of the total fuel contained in the tanks of the aircraft. The output signal 112 is connected to a subtract counter 114, the subtract counter 114 being constructed to receive the total fuel data entry device 22 output signal 112 and the multiply counter 86 output signal 100 and to provide an output signal 116 responsive to and indicative of the difference between the output signals 112 and 100 received by the subtract counter 114. More particularly, the output signal 116 is responsive to and indicative of the output signal 112 minus the output signal 100 or, in other words, indicative of the aircraft's total fuel less the fuel consumed, the output signal 116 being thus indicative of the available fuel remaining in the fuel tanks of the aircraft at any given time. The output signal 116 is connected to the available fuel decimal display device 52, the available fuel decimal display device 52 receiving the output signal 116 and providing a pilot perceivable output signal in the form of a decimal display indicating the available fuel remaining in the aircraft's fuel tanks at any given time.

The total distance to be traveled by the aircraft during a particular, predetermined flight is entered into the data input assembly 12 and, more particularly, entered into the total distance data entry device 24 by the pilot, the pilot entering the total distance by switching the thumbwheel entry type of data entry device 24 to a predetermined position indicating the total distance to be traveled by the aircraft. The pilot entered data via the total distance data entry device 24 is converted to a binary form via a decimal-to-binary converter in a manner similar to that described before with respect to the data entry devices 18, 20 and 22 to provide the output signal 118 responsive to and indicative of the total distance to be travelled by the aircraft. A subtract counter 120 is connected to the total distance data entry device 24 and receives the output signal 118 therefrom, the subtract counter 120 also being connected to and receiving the multiplier 108 output signal 110. The subtract counter 120 provides an output signal 122 indicative of the difference between the two received output signals 110 and 118. More particularly, the subtract counter 122 is constructed to provide the output signal 122 indicative of and responsive to the received output signal 118 less the received output signal 110.

Since the output signal 118 is indicative of the total distance to be traveled by the aircraft and the output signal 110 is indicative of the distance consumed by the aircraft, the output signal 122 is indicative of the distance remaining to be traveled during a particular flight at any given period of time. The output signal 122 indicative of the distance remaining to be traveled is connected to the distance remaining decimal display device 54, the distance remaining decimal display device 54 receiving the output signal 122 and providing a pilot perceivable decimal type of output signal indicating the distance remaining to be traveled by the aircraft.

The total time required for a particular flight as determined by the pilot is switched into the total time data entry device 26 and converted into a binary type of output signal 124 in a manner similar to that described before with respect to the other data entry devices. The output signal 124 of the total time data entry device 26 is connected to and received by a down counter 126, the down counter 126 being constructed to receive the output signal 124 and the clock signal 90.

More particularly, the clock signal 90 is connected to the down counter 126 via a switch 128 mechanically connected to and operated via a wheels up control 130, the wheels up control network 130 being connected to the aircraft's landing gear and activated via the lifting of the landing gear indicating that the aircraft has lifted off the ground closing the switch 128 and connecting the clock signal 90 to the down counter 126. The switch 128 is also interposed between the clock 88 and the up counter 94 so the distance consumed decimal display device 50 is operative in the closed position of the switch 128 indicating the aircraft has lifted off the ground. The control apparatus and network connected between the switch 128 and the landing gear of the aircraft for actuating the switch 128 in response to the lifting of the landing gear in a manner similar to that described before with respect to the wheels up control 130 is well-known in the art and a detailed description of the various components and the interconnections therebetween is not required herein. It should be noted that, in one preferred embodiment, the wheels up control 130 is operated manually by the pilot particularly in those instances where the aircraft has a fixed landing gear.

The down counter 126 receives the output signal 124 of the total time data entry device 26 and the clock signal 90 via the switch 128 and provides an output signal 132 indicative of the time remaining for the particular predetermined flight. In other words, the down counter 126 is initially set in response to the pilot entered data via the total time data entry device 26 at a predetermined initial level indicative of the total time required for the flight and the total time is then counted down via the down counter 126 in response to the clock signal 90 continuously indicative of the time during which the aircraft is lifted off the ground. The down counter 126 output signal 132 is connected to the time remaining decimal display device 56, the time remaining decimal display device 56 providing a pilot perceivable output indication in a decimal form or the like indicating the time remaining during any one predetermined flight.

The clock signal 90 is also connected to the wheels up time decimal display device 58 via the switch 128. The wheels up time decimal display device 58 thus receives the clock signal 90 in the closed position of the switch 128 and provides a pilot perceivable output indication in a decimal form indicating the time (designated in minutes) during which the aircraft has been air-borne.

The pilot enters the air pressure altitude of the aircraft into the pressure altitude data entry device 28 via a thumbwheel data entry type of device and enters the outside air temperature at that altitude into the outside temperature data entry device 30 via a thumbwheel data entry device or the like. The pressure altitude data entry device 28 and the outside air temperature data entry device 30 are each constructed to receive the pilot entered data in a decimal form and to convert the pilot entered data to a binary form via a decimal-to-binary converter in a manner similar to that described before with respect to the other data entry devices. The pressure altitude data entry device 28 provides an output signal 134 indicative of the outside air pressure altitude and the outside air temperature data entry device 30 provides an output signal 136 indicative of the outside air temperature. The output signals 134 and 136 are each connected to and received via a data storage network 138 and 140, respectively.

A multiply counter 142 is constructed and connected to receive an output signal 144 from the storage network 138 and an output signal 146 from the storage network 140, the multiply counter 142 providing an output signal 148 indicative of the air density altitude. The density altitude decimal display device 60 is connected and constructed to receive the multiply counter 142 output signal 148 and to provide a decimal type of pilot perceivable output indication in a decimal type of form indicative of the air density altitude in a manner similar to the digital display devices described before.

The short distance data entry device 32, the ground speed decimal display device 62 and the interconnecting portions of the data computation assembly 16 are constructed to be utilized for determining the aircraft's ground speed. The pilot enters a predetermined distance into the short distance data entry device 32 via switching a thumbwheel type of switch or the like in a manner similar to that described before with respect to the other data entry devices, the decimal number representing the pilot entered short distance being converted to a binary form of output signal 150 via a decimal-to-binary converter. The output signal 150 of the short distance data entry device 32 is connected to be received by a divide counter 152, the divide counter 152 providing an output signal 154 connected to the ground speed decimal display device 62, in a manner to be made more apparent below.

The data computation assembly 16 includes a slave clock 154 constructed to provide a slave clock signal 156 having a predetermined frequency in an activated position thereof, in a manner similar to the clock 88 described before. The slave clock signal 156 is connected to an up counter 158 via a momentary push button switch 160, the slave clock signal 156 being connected to and received by the up counter 158 in a depressed position of the push button switch 160.

The up counter 158 receives the slave clock signal 156 and provides an output signal 162 in response thereto and in a depressed position of the push button switch 160. The output signal 162 of the up counter 158 is connected to and received by the divide counter 152, the divide counter 152 being constructed to receive the output signal 150 and the output signal 162 and to provide the output signal 154 indicative of the output signal 150 divided by the count on the up counter 158 as indicated by the output signal 162 therefrom. The divide counter 152 output signal 154 is connected to the ground speed decimal display device 62 and the ground speed decimal display device 62 is constructed to display the output signal 154 in a decimal form, in a manner similar to that described above with respect to the other decimal display devices, the ground speed decimal display device 62, more particularly, displaying the aircraft's ground speed determined via the distance between the two predetermined points and the time for the aircraft to travel from the first predetermined position to the second predetermined position.

In practice, the short distance data entry device 32, the ground speed decimal display device 62 and the portion of the data computation assembly 16 connected therebetween are constructed to provide a system whereby the pilot can determine the ground speed of the aircraft in a relatively fast and convenient manner. For example, if the pilot knew that the distance between two towns or two predetermined points or otherwise locateable positions, the pilot would enter this known, short distance, expressed in miles, into the short distance data entry device 32, the output signal 150 being in the binary form and indicative of pilot entered short distance.

When the pilot passes over the first predetermined position, the pilot depresses the push button switch 160 activating the slave clock 154 and connecting the slave clock output signal 156 to the up counter 158, the up counter 158 being counted up via the slave clock pulse 156 connected thereto in this position of the push button 160. When the aircraft is positioned over the second predetermined position, the pilot releases the push button 160 deactivating the slave clock 154 and disconnecting the slave clock pulse 156 from the up counter 158. In this position, the divide counter 154 has received an output signal 150 indicative of the short distance entered into the short distance data entry device 32 via the pilot and the up counter 158 output signal 162 indicative of the total count of the slave clock output signal 156 during the time the aircraft was flying between the first predetermined position and the second predetermined position, the divide counter output signal 154 being thus indicative of the ground speed of the aircraft during the time the aircraft was in flight between the first position and the second position.

During a flight, the pilot is generally provided with various frequencies from a control tower and it is incumbent upon the pilot to recall these frequencies for various operations during the aircraft flight. For example, the pilot may be given what is generally referred to as a departure control frequency, an air tower control frequency, a ground control frequency and an approach control frequency.

The navigation data computation apparatus includes four frequency data entry devices 34, 36, 38 and 40 and, more particularly, includes: a frequency number one data entry device 34; a frequency number two data entry device 36; a frequency number three data entry device 38; and a frequency number four data entry device 40. Each of the frequency data entry devices 34, 36, 38 and 40 are constructed such that the pilot can enter a predetermined frequency via a thumbwheel type of switch and the pilot entered frequency is then converted into a binary form via a decimal-to-binary converter in a manner similar to that described before with respect to the other data entry devices. Each of the frequency data entry devices thus provides an output signal 164, 166, 168 and 170, respectively, indicative of the pilot entered frequency.

Each of the output signals 164, 166, 168 and 170 of the frequency data entry devices 34, 36, 38 and 40 are connected to one of the data storage networks 172, 174, 176 and 178, respectively, each of the data storage devices 172, 174, 176 and 178 being constructed in a manner similar to that described before with respect to the data storage devices 138 and 140 and each providing one of the output signals 180, 182, 184 and 186, respectively, indicative of the frequency entered into the frequency data entry devices 34, 36, 38 and 40 via the pilot and stored in one of the data storage devices 172, 174, 176 and 178. Each of the data storage devices 172, 174, 176 and 178 is connected to one of the indicator decimal display devices 66, 68, 70 and 72, respectively, and constructed such that each of the output signals 180, 182, 184, 186 is connected to one of the indicator decimal display devices 66, 68, 70 and 72 in response to the pilot command activating one of the data storage devices 172, 174, 176 and 178 to connect the output signal of the activated data storage device to the indicator decimal display device connected thereto. In this manner, the frequencies given to the pilot via the control tower are each stored in a portion of the data computation assembly 16 and are each displayed in a decimal form via one of the indicator decimal display devices 66, 68, 70 and 72 for immediate recall in response to a pilot command.

The pilot determined wind direction and wind speed or velocity is entered into the wind direction data entry device 42 and the wind speed data entry device 44 via a pilot manipulated thumbwheel switch type of data entry device in a manner similar to the data entry devices described before, the pilot entered data being converted to a binary form of output signal via a decimal-to-binary converter providing the output signals 188 and 190. The output signal 188 is indicative of the pilot entered wind direction and the output signal 190 is indicative of the pilot entered wind speed.

The output signals 188 and 190 are each connected to and received by a computer network 192 of the arithmetic logic unit type or the like wherein the output signals 188 and 190 are combined to provide an output signal 194 indicative of the aircraft's ground speed and an output signal 196 indicative of the aircraft's true heading, the ground speed and true heading being determined in a manner well-known in the art. The output signal 194 is connected to and received by the ground speed decimal display device 74, and the output signal 196 is connected to and received by the true heading decimal display device 76, the digital display devices 74 and 76 providing pilot perceivable output indications in a decimal form indicative of the aircraft's ground speed and true heading in a manner similar to that described before with respect to the other decimal display devices.

The pilot enters the pilot determined approach heading of the aircraft into the approach heading data entry device 46 via a thumbwheel switch type of data entry device in a manner similar to the data entry devices described before, the pilot entered data being converted into a binary form of output signal via a decimal-to-binary converter providing an output signal 198. The output signal 198 is indicative of the pilot entered approach heading and is conencted to and received via a comparator 200.

The comparator 200 is constructed to receive the output signal 198 and determine if the output signal 198 is indicative of an approach heading greater than or less than 180. If the output signal is greater than 180, the comparator 200 provides an output signal 202 and, if the output signal is less than or equal to 180, the comparator 200 provides an output signal 204.

The comparator 200 output signal 202 is connected to a subtract counter 206, the subtract counter 206 receiving the output signal 202 and providing an output signal 208 indicative of the output signal 202 less a predetermined number 180. The comparator 200 output signal 204 is connected to an add counter 210, the add counter 210 receiving the output signal 204 and providing an output signal 212 indicative of the output signal 204 plus a predetermined number 180. Thus, the output signals 208 and 212 are each indicative of the aircraft's course reciprocal and each of the output signals 208 and 212 are connected to the course reciprocal decimal display device 78, the course reciprocal digital display device 78 providing a pilot perceivable output indication in a decimal form indicative of the received output signal 208 and 212 (only one of the output signals 208 and 212 being received via the course reciprocal decimal display device 78 in response to one particular output signal 198), in a manner similar to that described before with respect to the other decimal display devices.

In operation, when the aircraft is approaching a particular landing field, the tower control provides the pilot with a particular approach heading. It is then necessary for the pilot to convert the received approach heading to a reciprocal course heading to arrive at a true heading for the aircraft with respect to navigation toward the control tower. The approach heading data entry device 46, the course reciprocal decimal display device 78 and the interconnecting portions of the data computation assembly 16 provide the pilot with a fast, convenient and reliable means for determining the aircraft's course reciprocal which is displayed for the pilot in a decimal form via the course reciprocal decimal display device 78 eliminating the necessity of the pilot having to calculate this particular data.

The divide, multiply, add and subtract counters 82, 86, 104, 108, 114, 120, 142, 152, 206 and 208, and the computer network 192 can each be constructed utilizing commercially available units, generally referred to in the art as "arithmetic logic elements" such as the arithmetic logic elements commercially available from Texas Instruments, Inc. and designated via the Part No. SN54181, for example. The up counters 92, 94 and 158 and the down counters 126 can each be constructed utilizing commercially available units such as the counters of Texas Instruments, Inc. and designated via the Part No. SN54190, for example. The storage elements 138, 140, 172, 174, 176 and 178 can be constructed utilizing commercially available units such as the addressable memories sold by Signetics International Corp. of Switzerland, designated by the Signetics International Corp. general part number "8220," for example. The comparator 200 can also be constructed utilizing commercially available units such as the comparator sold by the Signetics International Corp. of Switzerland, and sold under the general part designation "8242," for example.

The navigation data computation apparatus of the present invention thus provides a reliable and economical apparatus particularly suitable for installation in relatively small aircraft capable of providing the pilot with particular navigation data for immediate recall or in a manner wherein the necessary calculations are accomplished automatically thereby greatly reducing the opportunity of pilot error.

Changes may be made in the construction and the operation of the various components and assemblies described herein without departing from the spirit and the scope of the invention as defined in the following claims.

What is claimed is:

1. Navigation data computation apparatus for receiving pilot entered data and providing pilot perceivable output indications simulating predetermined navigation data for aiding a pilot in the navigation of an aircraft, comprising:

gallons per hour data entry means manually settable at the aircraft's fuel consumption and providing an output signal in response thereto and indicative thereof;

means receiving the gallons per hour data entry means output signal and providing an output signal indicative of the aircraft's fuel consumption expressed in terms of gallons per predetermined interval of time;

clock means connected to the starter of the aircraft's engine providing an output clock signal having a predetermined frequency responsive to the predetermined interval of time in response to the starting of the aircraft's engine;

up counter means receiving the clock signal and providing an output signal indicative of the total operational time of the aircraft's engine;

multiply counter means receiving the up counter means output signal and the output signal indicative of the aircraft's fuel consumption expressed in terms of gallons per predetermined interval of time and providing an output signal indicative of the product of the received signals; and fuel consumed decimal display means receiving the multiply counter means output signal and providing a pilot perceivable output indication indicative thereof, thereby indicating the fuel consumed by the aircraft.

2. The apparatus of claim 1 defined further to include:

total fuel data entry means manually settable at the fuel contained in the aircraft's fuel tanks and providing an output signal in response thereto and indicative thereof;

subtract counter means receiving the total fuel data entry means output signal and the multiply counter output signal and providing an output signal indicative of the total fuel data entry means output signal less the multiply counter output signal; and available fuel decimal display means receiving the subtract counter means output signal and providing a pilot perceivable output indication indicative thereof, thereby indicating the available fuel remaining in the aircraft's fuel tanks.

3. The apparatus of claim 1 defined further to include:

miles per hour data entry means manually settable at the aircraft's speed and providing an output signal in response thereto and indicative thereof;

means receiving the miles per hour data entry means output signal and providing an output signal indicative of the aircraft's speed expressed in terms of miles per predetermined interval of time;

up counter means receiving the clock signal and providing an output signal indicative of the total operational time of the aircraft's engine;

means interposed between the up counter means and the clock means connecting the clock signal to the up counter in response to the aircraft lifting off the ground;

multiply counter means receiving the last-mentioned up counter means output signal and the output signal indicative of the aircraft's speed expressed in terms of miles per predetermined interval of time and providing an output signal indicative of the product of the received signals; and distance consumed decimal display means receiving the last-mentioned multiply counter output signal and providing a pilot perceivable output indication indicative thereof, thereby indicating the distance traveled by the aircraft.

4. The apparatus of claim 1 defined further to include:

total time data entry means manually settable at a predetermined time required for a particular flight and providing an output signal in response thereto and indicative thereof;

down counter means receiving the clock signal in one position and the total time data entry means output signal and providing an output signal responsive to the total time data entry means output signal counted down via the received clock signal;

means interposed between the down counter means and the clock means connecting the clock signal to the down counter means in response to the aircraft lifting off the ground; and time remaining decimal display means receiving the down counter means output signal and providing a pilot perceivable output signal indicative thereof, thereby indicating the time remaining during a particular flight.

5. The apparatus of claim 1 defined further to include:

pressure altitude data entry means manually settable at the pressure altitude of the aircraft and providing an output signal in response thereto and indicative thereof;

outside air temperature data entry means manually settable at the outside air temperature of the aircraft and providing an output signal in response thereto and indicative thereof;

means receiving the pressure altitude data entry means output signal and the outside air temperature data entry means output signal and providing an output signal indicative of the density altitude of the aircraft; and density altitude decimal display means receiving the output signal indicative of the density altitude of the aircraft and providing a pilot perceivable output indication indicative thereof.

6. The apparatus of claim 1 defined further to include:

short distance data entry means manually settable at a predetermined short distance and providing an output signal responsive to and indicative thereof;

slave clock means providing a slave clock signal indicative of a predetermined interval of time;

divide counter means receiving the short distance data entry means output signal and the slave clock signal and providing an output signal indicative of the short distance data entry means output signal divided by the slave clock signal;

means manually operable interposed between the slave clock means and the divide counter means connecting the slave clock signal to the divide counter means, in one position thereof; and ground speed decimal display means receiving the divide counter means output signal and providing an output signal indicative thereof, thereby indicating the ground speed of the aircraft during the interval of time the slave clock signal was connected to the divide counter means.

7. The apparatus of claim 1 defined further to include:

frequency data entry means manually settable at a predetermined frequency and providing an output signal responsive thereto and indicative thereof;

means receiving and storing the frequency indicated via the frequency data entry means output signal, and providing an output signal indicative thereof in one position; and indicator decimal display means receiving the output signal from the means storing the frequency data entry means output signal and providing a pilot perceivable output indication indicative thereof.

8. The apparatus of claim 1 defined further to include:

wind direction data entry means manually settable at a predetermined wind direction and providing an output signal responsive thereto and indicative thereof;

wind speed data entry means manually settable at a predetermined wind speed and providing an output signal responsive thereto and indicative thereof;

computer means receiving the wind direction data entry means output signal and the wind speed data entry output signal and providing an output signal indicative of the aircraft's ground speed and an output signal indicative of the aircraft's true heading; and means receiving the computer means output signals and providing pilot perceivable output indications indicative of each of the received signals.

9. The apparatus of claim 1 defined further to include:

approach heading data entry means manually settable at a predetermined approach heading and providing an output signal responsive thereto and indicative thereof;

comparator means receiving the approach heading data entry means output signal and comparing the received signal with a predetermined number 180, the comparator means providing one output signal in response to a received signal less than the predetermined number and providing one other output signal in response to a received signal greater than the predetermined number;

subtract counter means receiving the comparator means output signal indicative of a received signal greater than the predetermined number and providing an output signal indicative of the received signal less 180;

add counter means receiving the comparator means output signal indicative of a received signal less than the predetermined number and providing an output signal indicative of the received signal plus 180; and course reciprocal decimal display means receiving the output signals from the subtract counter means and from the add counter means and providing a pilot perceivable output indication indicative of the received signals, thereby indicating the aircraft's course reciprocal.

10. Navigation data computation apparatus for receiving pilot entered data and providing pilot perceivable output indications simulating predetermined navigation data for aiding a pilot in the navigation of an aircraft, comprising:

short distance data entry means manually settable at a predetermined short distance and providing an output signal responsive to and indicative thereof;

slave clock means providing a slave clock signal indicative of a predetermined interval of time;

divide counter means receiving the short distance data entry means output signal and the slave clock signal and providing an output signal indicative of the short distance data entry means output signal divided by the slave clock signal;

means manually operable interposed between the slave clock means and the divide counter means connecting the slave clock signal to the divide counter means, in one position thereof; and ground speed decimal display means receiving the divide counter means output signal and providing an output signal indicative thereof, thereby indicating the ground speed of the aircraft during the interval of time the slave clock signal was connected to the divide counter means.

11. Navigation data computation apparatus for receiving pilot entered data and providing pilot perceivable output indications simulating predetermined navigation data for aiding a pilot in the navigation of an aircraft, comprising:

total time data entry means manually settable at a predetermined time required for a particular flight and providing an output signal in response thereto and indicative thereof;

clock means connected to the starter of the aircraft's engine providing an output clock signal having a predetermined frequency responsive to the predetermined interval of time in response to the starting of the aircraft's engine;

down counter means receiving the clock signal in one position and the total time data entry means output signal and providing an output signal responsive to the total time data entry means output signal counted down via the received clock signal;

means interposed between the down counter means and the clock means connecting the clock signal to the down counter means in response to the aircraft lifting off the ground; and time remaining digital decimal means receiving the down counter means output signal and providing a pilot perceivable output signal indicative thereof, thereby indicating the time remaining during a particular flight.

12. Navigation data computation apparatus for receiving pilot entered data and providing pilot perceivable output indications simulating predetermined navigation data for aiding a pilot in the navigation of an aircraft, comprising:

approach heading data entry means manually settable at a predetermined approach heading and providing an output signal responsive thereto and indicative thereof;

comparator means receiving the approach heading data entry means output signal and comparing the received signal with a predetermined number 180, the comparator means providing one output signal in response to a received signal less than the predetermined number and providing one other output signal in response to a received signal greater than the predetermined number;

subtract counter means receiving the comparator means output signal indicative of a received signal greater than the predetermined number and providing an output signal indicative of the received signal less 180;

add counter means receiving the comparator means output signal indicative of a received signal less than the predetermined number and providing an output signal indicative of the received signal plus 180; and course reciprocal decimal display means receiving the output signals from the subtract counter means and from the add counter means and providing a pilot perceivable output indication indicative of the received signals, thereby indicating the aircraft's course reciprocal.

* * * * *

UNITED STATES PATENT OFFICE
CERTIFICATE OF CORRECTION

Patent No. 3,836,690                     Dated September 17, 1974

Inventor(s) Homer Purtle, Jr.

It is certified that error appears in the above-identified patent and that said Letters Patent are hereby corrected as shown below:

Column 8, line 1, change "digital" to --decimal--

Column 10, line 25, change "digital" to --decimal--

Column 10, line 62, change "digital" to --decimal--

Column 15, line 36, change "digital decimal" to --decimal display--

Signed and sealed this 24th day of December 1974.

(SEAL)
Attest:

McCOY M. GIBSON JR.
Attesting Officer

C. MARSHALL DANN
Commissioner of Patents